United States Patent [19]

Hille et al.

[11] Patent Number: 5,370,910
[45] Date of Patent: Dec. 6, 1994

[54] PROCESS FOR THE PRODUCTION OF MULTICOAT PROTECTIVE AND/OR DECORATIVE COATINGS ON SUBSTRATE SURFACES

[75] Inventors: Hans-Dieter Hille, Bergisch-Gladbach; Stefan C. Wieditz, Münster; Arnold Dobbelstein, deceased, late of Münster, by Hildegard Emma Marie Dobbelstein, Christiane Elisabeth Dobbelstein, legal representatives; Horst Muller, Köln, all of Germany

[73] Assignee: BASF Lacke + Farben AG, Münster, Germany

[21] Appl. No.: 689,270

[22] PCT Filed: Jul. 24, 1989

[86] PCT No.: PCT/ED89/00868
§ 371 Date: Feb. 26, 1992
§ 102(e) Date: Feb. 26, 1992

[87] PCT Pub. No.: WO90/01041
PCT Pub. Date: Feb. 8, 1990

[30] Foreign Application Priority Data

Jul. 26, 1988 [DE] Germany .................. 3825278

[51] Int. Cl.$^5$ .............. B05D 1/36; C08G 18/34; C08G 18/42
[52] U.S. Cl. .............. 427/407.1; 427/409; 524/589; 524/591; 528/76; 528/77; 528/81
[58] Field of Search .............. 427/407.1, 409, 410; 524/591, 589; 528/76, 81, 77

[56] References Cited

U.S. PATENT DOCUMENTS

| | | | |
|---|---|---|---|
| 2,482,761 | 9/1949 | Goebel | 260/407 |
| 2,793,220 | 5/1957 | Barrett et al. | 260/407 |
| 2,793,221 | 5/1957 | Florentine | 260/413 |

(List continued on next page.)

FOREIGN PATENT DOCUMENTS

| | | |
|---|---|---|
| 228003 | 7/1987 | European Pat. Off. . |
| 256540 | 8/1987 | European Pat. Off. . |
| 299148 | 1/1989 | European Pat. Off. . |

*Primary Examiner*—Shrive Beck
*Assistant Examiner*—Diana Dudash
*Attorney, Agent, or Firm*—Kenyon & Kenyon

[57] ABSTRACT

The invention relates to a basecoat/clearcoat process in which the basecoat composition used contains as a film former a polyurethane resin which can be prepared by preparing an intermediate from (A) a mixture obtained from 10 to 90 mol % of linear polyether diols and 90 to 10 mol % of polyester diols,
(B) diisocyanates,
(C) compounds which contain two groups reactive toward isocyanate groups, at least some of these compounds having at least one group capable of forming anions, and the free isocyanate groups of the said intermediate are then reacted with
(D) polyols containing at least three hydroxyl groups, and the reaction product obtained in this manner is transferred into an aqueous base, wherein a) the polyester diol is prepared from diols and an acid component which consists of 60 to 100 % by weight of aliphatic dicarboxylic acids of more than 18 carbon atoms and of 40 to 0 % by weight of aliphatic dicarboxylic acids of 2 to 18 carbon atoms,
b) the equivalent ratio of the NCO groups to the total of the OH groups of (A) and the reactive groups of (C) is 2:1 to 1.05:1 and
c) the equivalent of the OH groups of the component (D) to the NCO groups of the intermediate is 0.5:1 to 4:1.

26 Claims, No Drawings

U.S. PATENT DOCUMENTS

| | | | |
|---|---|---|---|
| 2,901,467 | 8/1959 | Croco | 427/377 |
| 2,955,121 | 10/1960 | Myers et al. | 260/407 |
| 3,179,625 | 4/1965 | Ehrhart | 528/76 |
| 3,304,273 | 2/1967 | Stamberger | 528/76 |
| 3,378,531 | 4/1968 | Heins et al. | 528/76 |
| 4,066,591 | 1/1978 | Scriven et al. | 524/580 |
| 4,110,284 | 8/1978 | Violland et al. | 528/76 |
| 4,268,426 | 5/1981 | Williams et al. | 528/81 |
| 4,310,448 | 1/1982 | Reischl | 260/29.6 NR |
| 4,423,179 | 12/1983 | Guagliardo | 524/539 |
| 4,489,135 | 12/1984 | Drexler et al. | 427/407.1 |
| 4,558,090 | 12/1985 | Drexler et al. | 427/407.1 |
| 4,719,132 | 1/1988 | Porter, Jr. | 427/407.1 |
| 4,791,168 | 12/1988 | Salatin et al. | 427/412.1 |
| 4,859,743 | 8/1989 | Ambrose et al. | 427/407.1 |
| 4,861,826 | 8/1989 | Hummerich et al. | 524/839 |
| 4,977,207 | 12/1990 | Hoefer et al. | 524/591 |
| 5,047,294 | 9/1991 | Schwab et al. | 427/407.1 |
| 5,153,297 | 10/1992 | Münzmay et al. | 528/70 |
| 5,157,069 | 10/1992 | Campbell | 524/591 |
| 5,166,300 | 11/1992 | Rumon et al. | 528/81 |
| 5,210,154 | 5/1993 | Weidemeier et al. | 525/438 |

PROCESS FOR THE PRODUCTION OF MULTICOAT PROTECTIVE AND/OR DECORATIVE COATINGS ON SUBSTRATE SURFACES

The invention relates to a process for the production of multicoat protective and/or decorative coatings on substrate surfaces, to water-thinnable coating compositions based on polyurethane resins as film formers for the production of the coatings and to the use of these water-thinnable coating compositions for the production of multicoat protective and/or decorative coatings on substrate surfaces.

In the field of automotive finishing in particular, but also in other areas where coatings with a good decorative effect and at the same time with anticorrosive characteristics are desirable, it is known practice to coat substrates with several coatings superimposed on one another.

Multicoat coatings are preferably applied by the so-called basecoat-clearcoat i.e. process, a pigmented basecoat paint is first applied which, after a brief flash-off period, is coated by a clearcoat paint without a baking stage (wet-on-wet process). The basecoat and the clearcoat are subsequently baked together.

The basecoat-clearcoat process has gained great importance especially in automotive metallic finishes.

Attempts have been made for economic and ecological reasons to use aqueous basecoat compositions for the production of multicoat coatings.

The coating compositions for the production of basecoats for multicoat automotive coatings must be capable of being processed by the expedient wet-on-wet process, customary today, i.e. they must be capable, after as short preliminary drying as possible, of being coated by a (transparent) topcoat without exhibiting any effects due to solvent action of one coat on the other.

In addition, other problems must be solved in the development of coating compositions for basecoats for metallic finishes. The metallic effect depends decisively on the orientation of the metallic pigment particles in the paint film. A basecoat for metallic finishes, capable of being processed by the wet-on-wet process, must therefore produce paint films in which the metallic pigments are present in a suitable spatial orientation after having been applied and in which this orientation becomes set so rapidly that it cannot be disturbed in the course of the further painting process.

In the development of water-thinnable systems which would meet the above requirements, problems have arisen which are due to the special physical properties of water and difficult to solve, and only a small number of water-thinnable paint systems, which can be used in the above sense, are known so far.

Thus, for example, DE 3,545,618 discloses according to the preamble of the main claim processes as well as aqueous coating compositions for the production of basecoats for multicoat coatings. The process and the coating composition, however, are in need of improvement in respect both of the stability of the system of coatings in a condensed water test under constant conditions of temperature and humidity according to DIN 50017 (October 1982 edition) and of the metallic effect attainable after the basecoat compositions have been stored for several weeks (known in its abbreviated form as effect stability).

EP-A-256,540 likewise discloses a wet-on-wet process for multicoat coating. The basecoat paints used therein contain as film former a mixture of (1) 90 to 40% by weight of a polymeric resin containing hydroxyl groups and (2) 10 to 60% by weight of a polyurethane dispersion, the sum of the components (1) and (2) being always 100% by weight. However, the polyurethane dispersions used containing urea groups give rise to coating compositions which dry too rapidly and are therefore unsuitable for any practical application especially in production line painting processes, since the said coating compositions adhere so well to the equipment by means of which they are applied that they can only be removed with considerable difficulties. This makes it impossible, especially in automotive production line painting, to make frequent and rapid changes of the applied paint system (for example when changing color).

Furthermore, the coating compositions according to EP-A 256,540 are also in need of improvement in respect of adhesion and stone chip resistance.

U.S. Pat. No. 4,423,179 discloses aqueous and solvent-bound polyurethane coating compositions which contain 5 to 50% by weight, based on curing agents plus binders, of aminoplast resins as curing agents. The polyurethane binder component is employed in an amount from 50 to 95% by weight, based on curing agents plus binders, and is prepared by reacting a diisocyanate with a polyester polyol and, if desired, other compounds containing hydroxyl groups. The polyester polyols employed have an average molecular weight of 1000 to 4000 and are prepared from polyols and an acidic component consisting of 60 to 100% by weight of a dimeric fatty acid. This reaction between the polyester polyol and other OH components and the diisocyanate is terminated at the desired moment by the addition, if desired, of a multifunctional alcohol, for example an aminoalcohol or a triol. In the case of aqueous coating compositions, in order to achieve water dispersibility, some of the isocyanate groups are reacted with compounds which have an acid group and, in the α-position, at least 2 groups reactive toward isocyanate groups. The acid groups are subsequently neutralized with an amine.

Any comments regarding the suitability of these coating systems for a metallic basecoat paint in the 2-coat wet-on-wet process are lacking in this document as are any comments on the special requirements for polyurethane binders in this process.

The object of the invention has accordingly been to make available a process for the production of multicoat protective and/or decorative coatings on substrate surfaces, in which the coatings produced have a high stability in the condensed water test under constant conditions of temperature and humidity (CWT) according to DIN 50017 (October 1982 edition). In addition, the coatings produced should have satisfactory properties even if the basecoat paint has been stored for an extended period. In particular, a stable metallic effect (effect stability) should be achievable with the metallic basecoat paints in the wet-on-wet process even after an extended period of storage. In addition, the process should ensure that the basecoat paint can be applied without any problems by the application equipment used. Finally, any further requirements outlined above should be met.

A further object was the preparation of aqueous dispersions which can be used as coating composition in the above process for the production of multicoat protective and/or decorative coatings and meet all the requirements outlined above, such as effect stability after storage in the case of metallic basecoat paints, high stability in the CWT according to DIN 50017 (October 1982 edition) and capability of being applied without any problems by the application equipment used.

The object is achieved according to the invention by a process for the production of a multicoat protective and/or decorative coating on a substrate surface in which (1) an aqueous dispersion is applied as basecoat composition which dispersion contains
  (a) as a film former at least one polyurethane resin having an acid value from 5 to 70 mg of KOH/g, which can be prepared by preparing an intermediate (Z) having terminal isocyanate groups, from
(A) a mixture of linear polyether diols and polyester diols,
(B) diisocyanates,
(C) compounds which contain two groups reactive toward isocyanate groups, at least some of the compounds used as the component (C) having at least one group which is capable of forming anions and has preferably been neutralized before the reaction, and the free isocyanate groups of the said intermediate (Z) are then reacted with
(D) polyols containing at least three hydroxyl groups, preferably triols, and the resultant reaction product is transferred into an aqueous phase,
  (b) pigments and
  (c) other customary auxiliary substances,
(2) a polymeric film is formed on the surface from the composition applied in stage (1)
(3) a suitable transparent topcoat composition is applied to the basecoat obtained in this manner and subsequently
(4) the basecoat and the topcoat are baked together, wherein
I) a mixture consisting of 10 to 90 mol % of linear polyether diols (A1) having a molecular weight (number average) from 400 to 2000 and of 90 to 10 mol % of polyester diols (A2) having a molecular weight (number average) from 400 to 2000 is used as the component (A), the sum of (A1) and (A2) being always 100 mol % and the polyester diol (A2) being prepared from
a) a diol and
b) an acid component which consists of 60 to 100% by weight, preferably 100% by weight based on the acid component, of one or more aliphatic and/or cycloaliphatic dicarboxylic acids of more than 18 carbon atoms in the molecule, and of 40 to 0% by weight of one or more dicarboxylic acids of 2 to 18 carbon atoms in the molecule,
II) the proportions of the components (A), (B) and (C) are chosen such that the equivalent ratio of the NCO groups to the total of the OH groups of the component (A) and the reactive groups of the component (C) is 2:1 to 1.05:1, preferably 1.5:1 to 1.1:1, and
III) the amount of the component (D) is chosen such that the equivalent ratio of the OH groups of the component (D) to the NCO groups of the intermediate (Z) is 0.5:1 to 4:1, preferably 0.75:1 to 3.5:1.

The dispersions used according to the invention are preferably obtained by reacting the components (A), (B) and (C) to form an intermediate having terminal isocyanate groups. The reaction of the components (A), (B) and (C) is carried out by well known methods of polyurethane chemistry (cf. for example Kunststoff-Handbuch [Plastics Handbook], volume 7: Polyurethane, compiled by Dr. G. Oertel, Carl Hanser Publishers, Munich-Vienna, 1983), the components being preferably reacted in stages (for example formation of a first intermediate from components (A) and (B) which is then reacted with (C) to form a second intermediate). A simultaneous reaction of the components (A), (B) and (C) is, however, also possible.

The reaction may be carried out in the absence of solvents, but it is preferably performed in solvents which are inert toward isocyanate groups and miscible with water. The solvents advantageously used are those which, apart from having the properties described above, are good solvents for the polyurethanes produced and are easily separable from the aqueous mixtures. Acetone and methyl ethyl ketone are particularly suitable solvents.

A mixture consisting of 10 to 90 mol %, preferably of 20 to 80 mol % and most preferably of 25 to 70 mol %, in each case based on the total mol number of the component (A), of a linear polyether diol (component (A1)) and of 90 to 10 mol %, preferably of 80 to 20 mol % and most preferably of 75 to 30 mol %, based on the total mol number of the component (A), of a linear polyester diol (component (A2)) is used as the component (A), the sum of the components (A1) and (A2) being always 100 mol %.

Polyethers of the general formula

in which R=hydrogen or a lower alkyl radical, either unsubstituted or substituted by various substituents, n=2 to 6 and m=10 to 50 or even higher, are used as the component (A1). Examples are poly(oxytetramethylene) glycols, poly(oxyethylene) glycols and poly(oxypropylene) glycols. The linear polyether diols used have an average molecular weight (number average) in the region from 400 to 2000.

Poly(oxytetramethylene) glycols are the preferred polyalkylene ether polyols.

The polyester diols used as the component (A2) have likewise molecular weights (number average) in the region from 400 to 2000 and may be prepared by esterifying an acid component with diols.

The diols used for the preparation of the polyesters comprise alkylene glycols such as ethylene glycol, butylene glycol, neopentyl glycol and other glycols such as dimethylolcyclohexane and 3,3'-dihydroxymethylheptane.

The acid component of the polyester consists of at least 60% by weight, preferably 100% by weight, of one or more long-chain aliphatic and/or cycloaliphatic dicarboxylic acids of more than 18 carbon atoms in the molecule. The remaining 0 to 40% by weight of the acid component consists of one or more dicarboxylic acids or their anhydrides of 2 to 18 carbon atoms in the molecule.

Examples of suitable acids of 2 to 18 carbon atoms are phthalic acid, isophthalic acid, terephthalic acid, tetrahydrophthalic acid, hexahydrophthalic acid, adipic acid, azelaic acid, sebacic acid, maleic acid, glutaric acid, hexachloroheptanedicarboxylic acid and tetrachlorophthalic acid. Anhydrides of these acids, provided they exist, may be used in their place.

Any dicarboxylic acids of more than 18 carbon atoms in the molecule may in principle be used as long-chain aliphatic or cycloaliphatic dicarboxylic acids. However, the dicarboxylic acids of 36 carbon atoms known under the term "dimeric fatty acids" are most preferably used.

Methods of preparation of these dimeric fatty acids are known and are described, for example, in U.S. Pat. Nos. 2,482,761, 2,793,220, 2,793,221 and 2,955,121. In these methods fatty acids of 18 carbon atoms, for example linolenic, linoleic or oleic acids, are polymerized individually, in admixture with each other or in admixture with saturated fatty acids. The result is a mixture which contains principally dimeric (60–70%), but also monomeric and trimeric molecules, depending on the course of reaction, as well as a proportion of by-products, and which may be purified, for example, by distillation. Commercially available technical dimeric fatty acids contain inter alia at least 80% by weight of dimeric fatty acids as well as trimers up to a maximum of 20% by weight and monomers up to a maximum of 1% by weight. However, a commercially available dimeric fatty acid having a dimer content of at least 98% by weight, a trimer content of not more than 2% by weight and not more than traces of monomers is most preferably used according to the invention.

Any organic diisocyanate may be used as the component (B) for the preparation of the polyurethane dispersion. Examples of suitable diisocyanates are trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4'-biphenylene diisocyanate, 1,5-naphthylene diisocyanate, 1,4-naphthylene diisocyanate, 1-isocyanatomethyl-5-isocyanato-1,3,3-trimethylcyclohexane, bis(4-isocyanatocyclohexyl)methane, bis(4-isocyanatophenyl)-methane, 4,4'-diisocyanatodiphenyl ether and 2,3-bis(8-isocyanatooctyl)-4-octyl-5-hexylcyclohexene.

Compounds which contain two groups reactive toward isocyanate groups are used as the component (C), at least some of the compounds used as the component (C) possessing at least one group which is capable of forming anions, and has preferably been neutralized prior to the reaction.

By setting a certain mixture ratio between the compounds containing groups capable of forming anions and compounds free of these groups, it is possible to control the proportion of ionic groups in the polyurethane molecule and thereby ensure that the polyurethane resin produced from the components (A) to (D) has an acid value from 5 to 70 mg of KOH/g.

Suitable groups which react with isocyanate groups are particularly hydroxyl groups. The employment of compounds which contain primary or secondary amino groups, may have a negative effect on the processability of the dispersions described above. The type and amount of compounds containing amino groups which may be possibly utilized, are readily determined by an average person skilled in the art by simple routine tests.

Groups capable of forming anions are particularly carboxylic and sulfonic acid groups. These groups may be neutralized prior to the reaction in order to prevent a reaction with the isocyanate groups.

Suitable compounds which contain at least two groups reactive toward isocyanate groups and at least one group capable of forming anions are, for example, dihydroxypropionic acid, dimethylolpropionic acid, dihydroxysuccinic acid or dihydroxybenzoic acid. Polyhydroxylic acids obtainable by oxidation of monosaccharides, for example gluconic acid, saccharic acid, mucic acid, glucoronic acid and the like, are also suitable. Dimethylolpropionic acid is preferably used.

Examples of compounds containing amino groups are $\alpha,\delta$-diaminovaleric acid, 3,4-diaminobenzoic acid, 2,4-diaminotoluene-5-sulfonic acid, 4,4'-diaminodiphenyl ethersulfonic acid and the like.

Tertiary amines, for example trimethylamine, triethylamine, dimethylaniline, diethylaniline, triphenylamine and the like, are preferably used for the neutralization of the anionic groups. How ever, the neutralization may be also performed with other known organic and inorganic bases, for example sodium hydroxide, potassium hydroxide and ammonia.

Examples of compounds which can be used as compounds having two groups reactive toward isocyanate groups but being free from groups capable of forming anions, are low-molecular diols or diamines with primary or secondary amino groups.

The proportions of the components (A), (B) and (C) are chosen such that the equivalent ratio of the isocyanate groups to the total of the OH groups of the component (A) and the reactive groups of the component (C) is 2:1 to 1.05:1, preferably 1.5:1 to 1.1:1.

The reaction of the intermediate (Z) containing isocyanate groups and formed from (A), (B) and (C) with a polyol (D) containing at least three hydroxyl groups, preferably a triol, is preferably controlled by the stoichiometry of the compounds used in such a manner that chain lengthening and, if desired, branching of the binder molecules occurs. Care must be taken in this reaction that no crosslinked products are obtained (cf. for example U.S. Pat. No. 4,423,179), i.e. that the molecular weight of the polyurethane resin obtained from the components (A) to (D) does not exceed 40,000 (number average). On the other hand, the molecular weight should not be lower than 1,500 (number average).

In principle any polyol containing at least three hydroxyl groups which may be reacted with the intermediate obtained from (A), (B) and (C) in such a manner that no crosslinked products are formed, is suitable for the preparation of the polyurethane dispersion according to the invention. Examples are trimethylolpropane, glycerol, erythritol, mesoerythritol, arabitol, adonitol, xylitol, mannitol, sorbitol, dulcitol, hexanetriol, (poly)-pentaerythritol etc.

Especially good results are achieved when trimethylolpropane is used as the polyol.

The proportion of the component (D) is chosen such that the equivalent ratio of the OH groups of the component (D) to the isocyanate groups of the intermediate (Z) is 0.5:1 to 4:1, preferably 0.75:1 to 3.5:1. Furthermore consideration should be given in choosing the amount of the component (D) to the molecular weight of the intermediate (Z) and the desired molecular weights of the polyurethane resin. For if the molecular weight of the intermediate is low and a distinct increase in molecular weight is desired, it is known that the amount of the component (D) used will be lower than when the intermediate has a high molecular weight at which level the component (D) serves mainly to capture the free isocyanate groups and thus interrupt the reaction.

Apart from the preferred stepwise build-up of the polyurethane resin from the components (A), (B), (C) and (D) described above, a simultaneous reaction of all four components (A), (B), (C) and (D) is possible, in which case, however, care must be taken that non-crosslinked polyurethanes are obtained.

As is the case in the stepwise build-up, also in the simultaneous reaction of the components (A), (B), (C) and (D) it is necessary to choose the proportion of the individual components (A), (B), (C) and (D) such that the resultant polyurethane resin has a molecular weight from 1,500 to 40,000 (number average) and an acid value from 5 to 70 mg of KOH/g. The proportions of the components (A), (B), (C) and (D) are usually chosen such that the equivalent ratio of the NCO groups of the component (B) to the total of the groups of the components (A), (C) and (D) which are reactive towards NCO groups is 2:1 to 1:2, preferably 1.5:1 to 1:1.5.

The reaction product obtained in this manner may still contain free isocyanate groups which are hydrolyzed in the subsequent dispersing of the reaction product in water.

After the reaction of the intermediate obtained from (A), (B) and (C) with the polyol component, which reaction was preferably carried out in solvents which are inert toward isocyanate groups, are miscible with water, are a good solvent for the resultant polyurethane and can be readily separated from aqueous mixtures (for example acetone or methyl ethyl ketone), and after any desired neutralization of the groups capable of forming anions, or in the case of a single-step reaction after this single-step build-up reaction, the reaction product is transferred to an aqueous phase. This can be achieved, for example, by dispersing the reaction mixture in water and distilling off any organic solvents boiling below 100° C.

Under aqueous phase is to be understood water which may also contain organic solvents. Examples of solvents which may be present in the water are heterocyclic, aliphatic or aromatic hydrocarbons, monohydric or polyhydric alcohols, ethers, esters and ketones, for example N-methylpyrrolidone, toluene, xylene, butanol, ethylglycol and butylglycol as well as their acetates, butyldiglycol, ethylene glycol dibutyl ether, ethylene glycol diethyl ether, diethylene glycol dimethyl ether, cyclohexanone, methyl ethyl ketone, acetone, isophorone or mixtures thereof.

After the pH of the resultant polyurethane dispersion has been checked and if necessary adjusted to a value between 6 and 9, the dispersion forms the basis of the coating compositions used according to the invention into which the remaining constituents, for example additional binders, pigments, organic solvents and auxiliary substances are uniformly incorporated by dispersion using, for example, a stirrer or dissolver. Finally the pH is again checked and if necessary adjusted to a value of 6 to 9, preferably 7.0 to 8.5. In addition, the solids content and the viscosity are adjusted to a value suited to the particular conditions of application.

The ready-for-use coating compositions usually have a solids content of 10 to 30% by weight, and their efflux time in an ISO cup 4 is 15 to 30 seconds, preferably 18 to 25 seconds. Their proportion of water is 60 to 90% by weight, that of organic solvents 0 to 20% by weight, in each case based on the total coating composition.

The advantageous effects of the coating compositions used according to the invention are to be attributed to the use of the aqueous polyurethane dispersion described above.

In a number of cases it is desirable to improve selectively the properties of the resultant coatings by the simultaneous use of other binder systems in the basecoat composition.

The basecoat compositions used according to the invention advantageously contain as additional binder components a water-thinnable melamine resin in an amount from 1 to 80% by weight, preferably 20 to 60% by weight, based on the solids content of the polyurethane dispersion.

Water-soluble melamine resins are known per se and are employed to a large extent. They are etherified melamine-formaldehyde condensation products. Their water-solubility depends, apart from the degree of condensation which should be as low as possible, on the etherification component, only the lowest members of the alkanol monoether and ethylene glycol monoether series producing water-soluble condensates. The hexamethoxymethylmelamine resins are of the greatest significance. By the use of solubilizers even butanol-etherified melamine resins may be dispersed in the aqueous phase.

It is also possible to introduce carboxyl groups into the condensate. Transetherification products of highly etherified formaldehyde condensates with hydroxycarboxylic acids are water-soluble via their carboxyl group, after neutralization, and they may be used as crosslinking component in the coating compositions used according to the invention.

Other water-soluble or water-dispersible amino resins, for example benzoguanamine resins, may be used instead of the melamine resins described.

Where the basecoat composition used according to the invention contains a melamine resin, it may advantageously additionally contain as a further binder component a water-thinnable polyester resin and/or a water-thinnable polyacrylate resin, the weight ratio melamine resin: polyester resin/polyacrylate resin being 2:1 to 1:4 and the total proportion of melamine resin, polyester resin/polyacrylate resin being 1 to 80% by weight, preferably 20 to 60% by weight, based on the solids content of the polyurethane dispersion.

Water-thinnable polyesters are those having free carboxyl groups, i.e. polyesters with a high acid value.

Basically two methods are known for introducing the required carboxyl groups into the resin system. The first route involves interrupting the esterification at the desired acid value. After neutralization with bases, the polyesters obtained in this manner are soluble in water and form a film on baking. The second possibility consists of forming partial esters of dicarboxylic or polycarboxylic acids with hydroxyl-rich polyesters having a low acid value. Anhydrides of dicarboxylic acids which react under mild reaction conditions with the hydroxyl component with the formation of a free carboxyl group, are usually resorted to for this reaction.

In the same manner as the polyester resins described above, the water-thinnable polyacrylate resins contain free carboxyl groups. They usually are acrylic and methacrylic copolymers, preferably having a molecular weight (number average) from 2000 to 8000, and the carboxyl groups originate from the acrylic or methacrylic acid.

Blocked polyisocyanates may be also used as crosslinking agents. Any polyisocyanate in which the isocyanate groups have been reacted with a compound in such a manner that the resultant blocked polyisocyanate is non-reactive toward hydroxyl groups at room temperature but becomes reactive at elevated temperatures, usually in the range from 90° to 300° C., may be used in the invention. Any organic polyisocyanate which is suitable for the crosslinking may be used in the preparation of the blocked polyisocyanates. Isocyanates which contain about 3 to about 36, in particular about 8 to 15 carbon atoms, are preferred. The abovementioned diisocyanates (component B) are examples of suitable diisocyanates.

Polyisocyanates with higher isocyanate functionality may also be used. Examples of these are tris(4-isocyanatophenyl)methane, 1,3,5-triisocyanatobenzene, 2,4,6-triisocyanatotoluene, 1,2,5-tris(6-isocyanatohexyl)biuret, bis(2,5-diisocyanato-4-methylphenyl)methane and polymeric polyisocyanates such as dimers and trimers of diisocyanatotoluene. In addition, mixtures of polyisocyanates may also be employed.

The organic polyisocyanates, which are suitable for use as crosslinking agents in the invention, may also be prepolymers derived, for example, from a polyol including a polyether polyol or a polyester polyol. It is known that for this purpose polyols are reacted with an excess of polyisocyanates, giving rise to prepolymers with terminal isocyanate groups. Examples of polyols which may be used for this purpose are simple polyols such as glycols, for example ethylene glycol and propylene glycol, and other polyols such as glycerol, trimethylolpropane, hexanetriol and pentaerythritol; also monoethers such as diethylene glycol and dipropylene glycol, as well as polyethers which are adducts of such polyols and alkylene oxides. Examples of alkylene oxides which are suitable for a polyaddition to these polyols with the formation of polyethers are ethylene oxide, propylene oxide, butylene oxide and styrene oxide. These polyaddition products are generally designated as polyethers with terminal hydroxyl groups. They may be linear or branched. Examples of such polyethers are polyoxyethylene glycol of a molecular weight of 1540, polyoxypropylene glycol of a molecular weight of 1025, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers may be equally used. Particularly suitable are those polyether polyols which are obtainable by reacting such polyols as ethylene glycol, diethylene glycol, triethylene glycol, 1,4-butanediol, 1,3-butanediol, 1,6-hexanediol and mixtures thereof; glycerol trimethylolethane, trimethylolpropane, 1,2,6-hexanetriol, dipentaerythritol, tripentaerythritol, polypentaerythritol, methyl glucosides and saccharose, with alkylene oxides such as ethylene oxide, propylene oxide or mixtures thereof.

Any suitable aliphatic, cycloaliphatic or aromatic alkylmonoalcohol may be used for the blocking of the polyisocyanates. Examples of these are aliphatic alcohols such as methyl, ethyl, chloroethyl, propyl, butyl, amyl, hexyl, heptyl, octyl, nonyl, 3,3,5-trimethylhexyl, decyl and lauryl alcohols; aromatic alkyl alcohols such as phenylcarbinol and methylphenylcarbinol. Small amounts of higher-molecular monoalcohols of relatively low volatility may be used at the same time, if desired, these alcohols acting as plasticizers in the coatings after becoming detached.

Other suitable blocking agents are oximes, such as methyl ethyl ketone oxime, acetone oxime and cyclohexanone oxime as well as caprolactams, phenols and hydroxamic esters. Malonic esters, acetoacetic esters and β-diketones are preferred blocking agents.

The blocked polyisocyanates are prepared by reacting adequate amounts of an alcohol with the organic polyisocyanate in such a manner that free isocyanate groups are no longer present.

In addition the basecoat compositions used according to the invention contain known non-metallic pigments or dyes and/or metallic pigments customary in the paint industry. Metallic pigments alone or in combination with non-metallic pigments are used particularly preferably.

Suitable metallic pigments are metal powders, singly or in admixture, such as copper, copper alloys, aluminum and steel, preferably aluminum powder. Those commercially available metal powders are preferred as metal pigments which have been specially pretreated for aqueous systems.

The metallic pigments are used in an amount from 0 to 40% by weight, preferably 0.5 to 25% by weight, based on the total solids content of the coating components in the binders. If the metal powders are used in conjunction with one or more non-metallic pigments or dyes, the proportion of non-metallic pigments is chosen such that the desired metallic effect is not suppressed and that the amount of the metallic pigments is predominant.

Suitable non-metallic dyes or pigments may be either inorganic or organic. Examples are titanium dioxide, graphite, carbon black, zinc chromate, strontium chromate, barium chromate, lead chromate, lead cyanamide, lead silicochromate, zinc oxide, cadmium sulfide, chromium oxide, zinc sulfide, nickel titanium yellow, chromium titanium yellow, red iron oxide, black iron oxide, ultramarine blue, phthalocyanin complexes, naphthol red, quinacridones, halogenated thioindigo pigments or the like.

They are employed in the customary amounts, preferably in an amount from 0 to 20% by weight, based on the total formulation.

The coating compositions used according to the invention may also contain organic solvents in the customary amounts, preferably from 0 to 50% by weight, based on the total formulation, fillers in the customary amounts, preferably from 0 to 10% by weight, based on the total formulation, as well as other customary additives such as plasticizers, stabilizers, wetting agents, dispersants, flow-out agents, antifoams and catalysts either singly or in admixture in the customary amounts, in each case preferably from 0 to 5% by weight, based on the total formulation. These substances may be added either to the single components and/or to the total mixture.

Examples of suitable fillers are talc, mica, kaolin, chalk, quartz powder, asbestos powder, ground shale, barium sulfate, various silicas, silicates, glass fibers, organic fibers and the like.

The coating compositions described above are used according to the invention in a process for the production of multicoat coatings on substrate surfaces, wherein
  (1) an aqueous dispersion is applied as basecoat composition, (2) a polymeric film is formed on the substrate surface from the composition applied in stage (1), (3) a suitable transparent topcoat composition is applied to the basecoat obtained in this manner and subsequently (4) the basecoat and the topcoat are baked together.

Basically any known non-pigmented or only clear-pigmented coating composition is suitable as the topcoat composition. These may be conventional solvent-bound clearcoats, water-thinnable clearcoats or powder clearcoats.

Suitable substrates to be coated are principally pretreated metallic substrates; however, even non-pretreated metals and any other substrates, for example wood, plastics etc., may be coated by a multicoat protective and/or decorative coating using the basecoat compositions according to the invention.

The basecoat compositions used according to the invention may be applied without difficulties with any suitable application equipment, and they give rise to coatings having very good technical properties even after extended storage time prior to the application. They are particularly suitable as metallic basecoat for the wet-on-wet process, they have a very good effect stability and the resultant coatings have a very high stability in the condensed water test under constant conditions of temperature and humidity according to DIN 50017 (October 1982 edition).

The invention is elucidated in greater detail in the examples below. All parts and percentages are parts and percentages by weight, unless expressly stated otherwise.

Preparation of a water-soluble polyester

The water-soluble polyester employed is prepared in the following manner:

832 parts by weight of neopentyl glycol are weighed into a reaction vessel provided with a stirrer, a thermometer and a packed column, and melted. 664 parts by weight of isophthalic acid are added. The reaction mixture is heated with stirring in such a manner that the temperature at the head of the column does not exceed 100° C. The esterification is allowed to proceed at a temperature not higher than 220° C. until an acid value of 8.5 is reached. After allowing the mixture to cool to 180° C., 384 parts by weight of trimellitic anhydride are added and the esterification is allowed to proceed until an acid value of 39 is reached. The reaction mixture is diluted with 425 parts by weight of butanol.

Melamine resin

A commercially available, low-molecular melamine-formaldehyde resin highly etherified with methanol, having a solids content of 70% by weight in water, is used.

Aluminum pigment paste

Commercially available aluminum pigment paste, 65% in water, average particle diameter 10 μm.

Clearcoat paint

A commercially available 2-pack clear-coat paint based on polyacrylate/polyisocyanate, suitable for automotive refinishing, is used.

EXAMPLE 1

The water of reaction formed when 490 parts by weight of a condensation product (acid value 2 mg of KOH/g, molecular weight=784) obtained from 1 mol of a polymeric technical fatty acid (dimer content at least 98% by weight, trimer content not more than 2% by weight, monomer content traces only) and 2 mol of hexane-1,6-diol, 490 parts by weight of polytetrahydrofuran (molecular weight=1000) and 88.2 parts by weight of dimethylolpropionic acid are allowed to react in a reaction vessel provided with a stirrer, water separator and temperature control, is removed in vacuo (about 20 mbar) for ½ hour at 80° C. 550.2 parts by weight of 4,4'-diisocyanatodicyclohexylmethane, 650 parts by weight of methyl ethyl ketone and 1 part by weight of dibutyltin dilaurate are then added successively with stirring, and the reaction mixture is heated to 80° C. under nitrogen as protective gas.

When an NCO content of 1.50%, based on the total composition, is reached, 39.3 parts by weight of trimethylolpropane are added at 80° C. and the reaction is continued at 80° C. until a viscosity of 6.3 dPas (the sample is diluted with N-methylpyrrolidone in the ratio 1:1) is reached. The reaction mixture is then cooled and a mixture of 50.3 parts by weight of dimethylethanolamine and 3796 parts by weight of deionized water is run in slowly. The methyl ethyl ketone is then distilled off in vacuo and the reaction mixture is adjusted to a nonvolatile content of 25% by the addition of 1201 parts by weight of deionized water. A milky polyurethane dispersion 1 having a pH of 8.2 and an acid value of the polyurethane resin of 25 mg of KOH/g is obtained.

24 parts by weight of the polyurethane dispersion 1 are added with stirring to 25 parts by weight of a thickener (a sodium magnesium silicate paste with a stratified structure, 3% in water). 5 parts by weight of the polyester resin, 0.5 part by weight of dimethylethanolamine (10% in water), 2 parts by weight of melamine resin, 5 parts by weight of aluminum pigment paste, 5 parts by weight of butylglycol and 27.5 parts by weight of water are added with further stirring. After 30 minutes' stirring, the viscosity of the mixture is adjusted to an efflux time of 14 to 15 seconds (measured in a DIN 4 cup at 23° C.).

The resultant coating composition 1 is sprayed onto a phosphated steel panel. After a flash-off period of 15 minutes at room temperature, the clearcoat paint is applied. The resultant two-coat coating is baked in a circulating air oven for 40 minutes at 80° C. (object temperature). The test results of the resultant coating are shown in Table 1.

EXAMPLE 2

Example 2 is carried out in the same manner as Example 1 except that 305 parts by weight (instead of 490 parts by weight) of the condensation product (acid value 2 mg of KOH/g; molecular weight 784) and 819 parts by weight (instead of 490 parts by weight) of polytetrahydrofuran (molecular weight=1000) are used for the preparation of the polyurethane dispersion. A finely divided polyurethane dispersion 2 having a pH value of 8.0 and an acid value of 24 mg of KOH/g is obtained. In the same manner as in Example 1, the polyurethane dispersion 2 is processed to form a basecoat paint 2 which is applied by the wet-on-wet process in the same manner as in Example 1. The test results of the resultant coating are shown in Table 1.

Comparison Example 1

698 parts by weight of a condensation product (molecular weight 1460) obtained from 1 mol of a polymeric technical fatty acid (dimer content at least 98% by weight, trimer content not more than 2% by weight, monomer content not more than traces), 1 mol of isophthalic acid and 2.626 mol of hexanediol, 43 parts by weight of dimethylolpropionic acid, 16 parts by weight of neopentyl glycol, 300 parts by weight of methyl ethyl ketone and 259 parts by weight of isophorone diisocyanate are heated to 80° C. in a reaction vessel provided with a stirrer, water separator and temperature control, in an atmosphere of nitrogen. 0.3 part by weight of dibutyltin dilaurate is then added and the reaction is allowed to proceed until an NCO content of 1.16%, based on the total composition, is reached. 37 parts by weight of trimethylolpropane and 250 parts by weight of methyl ethyl ketone are then added and the reaction mixture is stirred at 80° C. until isocyanate is no longer detectable.

A mixture of 20 parts by weight of dimethylethanolamine in 2068 parts by weight deionized water is then slowly introduced with stirring. The methyl ethyl ketone is distilled off in vacuo. A finely divided dispersion 3 having a pH of 7.8, a non-volatile content of 27% and an acid value of the polyurethane of 17 mg of KOH/g, is obtained.

A basecoat paint 3 is prepared as described in Example 1. In contrast to Example 1, 22.2 parts by weight of the polyurethane dispersion 3 are used instead of 24 parts by weight of the polyurethane dispersion 1.

In the same manner as in Example 1, the resultant coating composition 3 is applied by the wet-on-wet process to phosphated steel panels and baked together with the clearcoat. The test results of the resultant coating are shown in Table 1.

Comparison Example 2

255 parts by weight of a polyester obtained from hexane-1,6-diol and isophthalic acid, having an average molecular weight of 614, are heated together with 248 parts by weight of a polypropylene glycol having an average molecular weight of 600 and with 100 parts by weight of dimethylolpropionic acid to 100° C. and the water of reaction formed is removed during 1 hour in vacuo. 526 parts by weight of 4,4'-dicyclohexylmethane diisocyanate and 480 parts by weight of methyl ethyl ketone are added at 80° C. The reaction mixture is stirred at 80° C. until the content of free isocyanate groups is 1.69%, based on the total weight.

28.5 parts by weight of trimethylolpropane are then added, followed by 0.4 part by weight of dibutyltin dilaurate and the reaction mixture is stirred for a further 2 hours at 80° C. After adding 1590 parts by weight of methyl ethyl ketone, the stirred at 80° C. until the viscosity, measured in a DIN 4 cup, is 65 seconds (the sample is dissolved in N-methylpyrrolidone in the ratio 2:3).

After the addition of a mixture consisting of 22.4 parts by weight of dimethylethanolamine and 2650 parts by weight of deionized water, the methyl ethyl ketone is distilled off in vacuo, yielding a finely divided dispersion 4 with a solids content of 30%, a pH of 7.4, a viscosity of 48 seconds, measured in DIN 4 cup, and an acid value of the polyurethane resin 35 mg of KOH/g.

As described in Example 1, a coating composition 4 is prepared using 20 parts by weight of the polyurethane dispersion 4 (instead of 24 parts by weight of polyurethane dispersion 1) and is applied, in the same manner as in Example 1, by the wet-on-wet process to phosphated steel panels and baked together with a clearcoat. The test results of the resultant coating are shown in Table 1.

Comparison Example 3

The water of reaction formed when 960 parts by weight of polytetrahydrofuran (molecular weight 650) and 112.5 parts by weight of dimethylolpropionic acid are allowed to react in a reaction vessel provided with a stirrer, water separator and temperature control, is removed in vacuo at 80° C. 786 parts by weight of 4,4'diisocyanatodicyclohexylmethane, 500 parts by weight of methyl ethyl ketone and 1 part by weight of dibutyltin dilaurate are then added successively with stirring and the reaction mixture is heated to 80° C. in an atmosphere of nitrogen.

After an NCO content of 1.98%, based on the total composition, has been reached, 49.6 parts by weight of trimethylolpropane are added and the reaction is allowed to continue at 80° C. until a viscosity of 170 seconds (measured in a DIN 4 cup a 23° C., sample diluted with N-methylpyrrolidone in the ratio 1:1) is reached. A mixture of 61 parts by weight of dimethylethanolamine and 4374 parts by weight of deionized water is then allowed to run in slowly. The methyl ethyl ketone is then distilled off in vacuo and the mixture is adjusted to a non-volatile content of 25% with 1152 parts by weight of deionized water. A milky dispersion 5 having a pH of 8.4 and an acid value of the polyurethane resin of 25 mg of KOH/g is obtained.

As described in Example 1, a coating composition 5 is prepared using 24 parts by weight of the polyurethane dispersion 5 and is applied in the same manner as in Example 1 to phosphated steel panels and baked together with the clearcoat. The test results of the resulting coating are shown in Table 1.

TABLE 1

| | Test results | | | | |
|---|---|---|---|---|---|
| | Example 1 | Example 2 | Comparison Example 1 | Comparison Example 2 | Comparison Example 3 |
| Metallic effect fresh 1) | 120 | 125 | 122 | 120 | 125 |
| after 8 weeks 2) | 102 | 111 | 87 | 100 | 100 |
| DOI 3) prior to CWT 4) | 89 | 86 | 92 | 92 | 90 |
| after CWT 5) | 84 | 87 | 79 | 43 | 73 |

1) Determination of the metallic effect on coated steel panels, the basecoat paint being applied direct after preparation and baked together with the clearcoat, as described in the examples. The numbers given in each case are the quotient of the measured direct view reflectivity $R_D$ and oblique view reflectivity $R_S$ in a goniophotometer, multiplied by 100.
2) As 1), but the complete basecoat paint has been stored for 8 weeks at room temperature before being applied.
3) Distinctness of reflected image: The direct reflection is measured at a glancing angle of −30° and in the immediate proximity of the glancing angle at −30° ± 0.3° at an illumination of the surface to be assessed under 30°. The DOI value thus determined corresponds to the visually perceived sharpness of the reflected image of an object on this surface. The DOI value is also referred to as the distinctness of the image value. Measurement values: 100 bes t, 0 worst; measuring instruments: Dorigon D47R-6F from HunterLab; illumination 30°, observation −30°, −29.7°, −30.3°.
4) Measured DOI value of the 2-coat coating described in the examples, except that, as in 2), the basecoat paint has been stored for 8 weeks at room temperature prior to application.
5) As 4), except that the DOI value was measured after exposure to the condensed water test under constant conditions of temperature and humidity (CWT) according to DIN 50017 (October 1982 edition) after 1 hour's regeneration.

The test results of Table 1 indicate that the coated panels produced by the process according to the invention have an outstanding stability in the condensed water test under constant conditions of temperature and humidity (CWT) according to DIN 50017 (October 1982 edition), a very good metallic effect and a very good effect stability.

If on the other hand basecoat paints are used in which only polyester diols (the acid component consists of up to 50 mol % of dimeric fatty acid) were employed as the component (A) in the preparation of the polyurethane resin (Comparison Example 1), the effect stability of the basecoat after a storage period of 8 weeks is wholly inadequate.

If basecoat paints are used in which, in the preparation of the polyurethane resin, the component (A) contains no polyester diols whose acid component contains at least 60% by weight of an aliphatic dicarboxylic acid of more than 18 carbon atoms (Comparison Examples 2 and 3), the resultant coatings possess very poor stability in the condensed water test under constant conditions of temperature and humidity.

Furthermore, the basecoat compositions can be applied without any difficulties by the application equipment to be used.

It is claimed:

1. A process for the production of a multicoat coating on a substrate surface comprising:
   (1) applying an aqueous dispersion of a basecoat composition to a substrate surface wherein said basecoat composition includes
      (a) a polyurethane resin having an acid value from about 5 to about 70 mg of KOH/g, wherein said polyurethane resin is obtained by reacting
         (A) a mixture of a linear polyether diol and a polyester diol,
         (B) a diisocyanate, and
         (C) a compound containing two groups reactive with isocyanate groups, wherein at least one of said two groups is capable of forming anions, to produce an intermediate (Z) having terminal isocyanate groups, then reacting said intermediate (Z) with
         (D) a polyol containing at least three hydroxyl groups to produce a reaction product that is then transferred into an aqueous phase; and
      (b) a pigment;
   (2) forming a basecoat on said substrate surface;
   (3) applying a topcoat composition to said basecoat; and
   (4) baking said topcoat and basecoat; wherein mixture (A) consists of from about 10 to about 90 mol % of a linear polyether diol (A1) having a number average molecular weight from about 400 to about 2000 and from about 90 to about 10 mol % of a polyester diol (A2) having a number average molecular weight from about 400 to about 2000, wherein the sum of (A1) and (A2) is 100 mol %, and wherein the polyester diol (A2) is obtained from
      (a) a diol and
      (b) an acid wherein from about 60 to about 100 weight % of said acid is an aliphatic dicarboxylic acid or a cycloaliphatic dicarboxylic acid having more than 18 carbon atoms per molecule, and from about 0 to about 40 weight % of said acid is a dicarboxylic acid having 2 to 18 carbon atoms in the molecule,
   wherein the amounts of components (A), (B) and (C) are such that the equivalent ratio of the isocyanate groups to the total of the OH groups of components (A1) and (A2) of mixture (A) and the reactive groups of component (C) is from about 2:1 to about 1.05:1, and wherein the amount of component (D) is such that the equivalent ratio of the OH groups of component (D) to the terminal isocyanate groups of intermediate (Z) is from about 0.5:1 to about 4:1.

2. The process according to claim 1 wherein said groups capable of forming anions in component (C) are neutralized before reacting said component (C) with said diisocyanate.

3. The process according to claim 1 wherein said polyol (D) is a triol.

4. The process according to claim 1 wherein the acid used to form the polyester diol (A2) is 100 percent by weight of an aliphatic dicarboxylic acid or a cycloaliphatic dicarboxylic acid having more than 18 carbon atoms per molecule.

5. The process according to claim 1 wherein the amounts of components (A), (B) and (C) are such that the equivalent ratio of the isocyanate groups to the total of the OH groups of components (A1) and (A2) of mixture (A) and the reactive groups of component (C) is from about 1.5:1 to about 1.1:1.

6. The process according to claim 1 wherein the amount of component (D) is such that the equivalent ratio of the OH groups of component (D) to the terminal isocyanate groups of intermediate (Z) is from about 0.75:1 to about 3.5:1.

7. The process according to claim 1 wherein said mixture (A) consists of from about 20 to about 80 mol % of linear polyether (A1) and from about 80 to about 20 mol % of polyester diol (A2).

8. The process according to claim 1 wherein said mixture (A) consists of from about 25 to about 70 mol % of linear polyether (A1) and from about 75 to about 30 mol % of polyester diol (A2).

9. The process according to claim 1 wherein said basecoat composition further includes a water-thinnable melamine resin in an amount from about 1 to about 80 weight % based on the total solids content of said dispersion.

10. The process according to claim 9 wherein said basecoat composition includes an additional water-thinnable resin selected from the group consisting of a polyester resin and a polyacrylate resin, wherein the weight ratio of said melamine resin to said additional resin is from about 2:1 to 1:4 and wherein the total amount of said melamine resin, said polyester resin and said polyacrylate resin is from about 1 to about 80 weight % based on the total solids content of said dispersion.

11. The process according to claim 1 wherein said basecoat composition further includes a blocked polyisocyanate and a water-thinnable resin selected from the group consisting of a polyester resin and a polyacrylate resin, wherein the total amount of said blocked polyisocyanate, said polyester resin and said polyacrylate resin is from about 1 to about 80 weight % based on the total solids content of said dispersion.

12. The process according to claim 1 wherein said pigment comprises a metallic pigment and wherein said metallic pigment comprises from about 0.5 to about 25 weight % of the total solids content of said dispersion.

13. A coating composition useful for the production of a multicoat coating on a substrate surface comprising:
   (1) an aqueous dispersion of a basecoat composition, wherein said basecoat composition includes
      (a) a polyurethane resin having an acid value from about 5 to about 70 mg of KOH/g, wherein said polyurethane resin is obtained by reacting (A) a mixture of linear polyether diol and a polyester diol,
(B) a diisocyanate, and
(C) a compound containing two groups reactive with isocyanate groups, wherein at least one of said two groups is capable of forming anions, to produce an intermediate (Z) having terminal isocyanate groups, then reacting said intermediate (Z) with
(D) a polyol containing at least three hydroxyl groups; and (b) a pigment; wherein mixture (A) consists of from about 10 to about 90 mol % of a linear polyether diol (A1) having a number average molecular weight from about 400 to about 2000 and from about 90 to about 10 mol % of a polyester diol (A2) having a number average molecular weight from about 400 to about 2000, wherein the sum of (A1) and (A2) is 100 mol %, and wherein the polyester diol (A2) is obtained from
(a) a diol and
(b) an acid wherein from about 60 to about 100 weight % of said acid is an aliphatic dicarboxylic acid or a cycloaliphatic dicarboxylic acid having more than 18 carbon atoms per molecule, and from about 0 to about 40 weight % of said acid is a dicarboxylic acid having 2 to 18 carbon atoms in the molecule,
wherein the amounts of components (A), (B) and (C) are such that the equivalent ratio of the isocyanate groups to the total of the OH groups of components (A1) and (A2) of mixture (A) and the reactive groups of component (C) is from about 2:1 to about 1.05:1; and wherein the amount of component (D) is such that the equivalent ratio of the OH groups of component (D) to the terminal isocyanate groups of intermediate (Z) is from about 0.5:1 to about 4:1.

14. The coating composition of claim 13 wherein said groups capable of forming anions in component (C) are neutralized before reacting said component (C) with said diisocyanate.

15. The coating composition of claim 13 wherein said polyol (D) is a triol.

16. The coating composition of claim 13 wherein the acid used to form the polyester diol (A2) is 100 percent by weight of an aliphatic dicarboxylic acid or a cycloaliphatic dicarboxylic acid having more than 18 carbon atoms per molecule.

17. The coating composition of claim 13 wherein the amounts of components (A), (B) and (C) are such that the equivalent ratio of the isocyanate groups to the total of the OH groups of components (A1) and (A2) of mixture (A) and the reactive groups of component (C) is from about 1.5:1 to about 1.1:1.

18. The coating composition of claim 13 wherein the amount of component (D) is such that the equivalent ratio of the OH groups of component (D) to the terminal isocyanate groups of intermediate (Z) is from about 0.75:1 to about 3.5:1.

19. The coating composition of claim 13 wherein said mixture (A) consists of from about 20 to about 80 mol % of linear polyether (A1) and from about 80 to about 20 mol % of polyester diol (A2).

20. The coating composition of claim 13 wherein said mixture (A) consists of from about 25 to about 70 mol % of linear polyether (A1) and from about 75 to about 30 mol % of polyester diol (A2).

21. The coating composition of claim 13 wherein said basecoat composition further includes a water-thinnable melamine resin in an amount from about 1 to about 80 weight % based on the solids content of said dispersion.

22. The coating composition of claim 21 wherein said aqueous dispersion contains an additional water-thinnable resin selected from the group consisting of a polyester resin and a polyacrylate resin, wherein the weight ratio of said melamine resin to said additional resin is from about 2:1 to 1:4 and wherein the total amount of said melamine resin, said polyester resin and said polyacrylate resin is from about 1 to about 80 weight % based on the total solids content of said dispersion.

23. The coating composition of claim 13 wherein said dispersion further contains a blocked polyisocyanate and a water-thinnable resin selected from the group consisting of a polyester resin and a polyacrylate resin, wherein the total amount of said blocked polyisocyanate, said polyester resin and said polyacrylate resin is from about 1 to about 80 weight % based on the solids content of said dispersion.

24. The coating composition of claim 13 wherein said pigment comprises a metallic pigment and wherein said metallic pigment comprises from about 0.5 to about 25 weight % of the total solids content of said dispersion.

25. A process for the production of a multicoat coating on a substrate surface comprising:
(1) applying an aqueous dispersion of a basecoat composition to a substrate surface wherein said basecoat composition includes
(a) a polyurethane resin having an acid value from about 5 to about 70 mg of KOH/g, wherein said polyurethane resin is obtained by reacting
(A) a mixture of a linear polyether diol and a polyester diol,
(B) a diisocyanate,
(C) a compound containing two groups reactive with isocyanate groups, wherein at least one of said two groups is capable of forming anions, and
(D) a polyol containing at least three hydroxyl groups; and
(b) a pigment;
(2) forming a basecoat on said substrate surface;
(3) applying a topcoat composition to said basecoat; and
(4) baking said topcoat and basecoat; wherein mixture (A) consists of from about 10 to about 90 mol % of a linear polyether diol (A1) having a number average molecular weight from about 400 to about 2000 and of from about 90 to about 10 mol % of a polyester diol (A2) having a number average molecular weight from about 400 to about 2000, wherein the sum of (A1) and (A2) is 100 mol %, and wherein the polyester diol (A2) is obtained from
(a) a diol and
(b) an acid wherein from about 60 to about 100 weight % of said acid is an aliphatic dicarboxylic acid or a cycloaliphatic dicarboxylic acid having more than 18 carbon atoms per molecule, and from about 0 to about 40 weight % of said acid is a dicarboxylic acid having 2 to 18 carbon atoms in the molecule,
wherein the amounts of components (A), (B) and (C) are such that the equivalent ratio of the isocyanate groups to the total of the OH groups of components (A1) and (A2) of mixture (A) and the reactive groups of component (C) is from about 2:1 to about 1.05:1, and wherein the amount of component (D) is such that the equivalent ratio of the OH groups of component (D) to the terminal isocyanate groups of the polyurethane resin is from about 0.5:1 to about 4:1.

26. A coating composition useful for the production of a multicoat coating on a substrate surface comprising:
   (1) an aqueous dispersion of a basecoat composition wherein said basecoat composition includes
      (a) a polyurethane resin having an acid value from about 5 to about 70 mg of KOH/g, wherein said polyurethane resin is obtained by reacting
         (A) a mixture of linear polyether diol and a polyester diol,
         (B) a diisocyanate, and
         (C) a compound containing two groups reactive with isocyanate groups, wherein at least one of said two groups is capable of forming anions, and
         (D) a polyol containing at least three hydroxyl groups; and
      (b) a pigment; wherein mixture (A) consists of from about 10 to about 90 mol % of a linear polyether diol (A1) having a number average molecular weight from about 400 to about 2000 and of from about 90 to about 10 mol % of a polyester diol (A2) having a number average molecular weight from about 400 to about 2000, wherein the sum of (A1) and (A2) is 100 mol %, and wherein the polyester diol (A2) is obtained from
         (a) a diol and
         (b) an acid wherein from about 60 to about 100 weight % of said acid is an aliphatic dicarboxylic acid or a cycloaliphatic dicarboxylic acid having more than 18 carbon atoms per molecule, and from about 0 to about 40 weight % of said acid is a dicarboxylic acid having 2 to 18 carbon atoms in the molecule, wherein the amounts of components (A), (B) and (C) are such that the equivalent ratio of the isocyanate groups to the total of the OH groups of components (A1) and (A2) of mixture (A) and the reactive groups of component (C) is from about 2:1 to about 1.05:1, and wherein the amount of component (D) is such that the equivalent ratio of the OH groups of component (D) to the terminal isocyanate groups of the polyurethane resin is from about 0.5:1 to about 4:1.

* * * * *